(12) United States Patent
Sharma et al.

(10) Patent No.: US 7,558,649 B1
(45) Date of Patent: Jul. 7, 2009

(54) METHOD FOR PREDICTING AIRFLOW RATES

(75) Inventors: Ratnesh K. Sharma, Union City, CA (US); Cullen E. Bash, Los Gatos, CA (US); Chandrakant D. Patel, Fremont, CA (US); Abdlmonem H Beitelmal, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 235 days.

(21) Appl. No.: 11/416,763

(22) Filed: May 3, 2006

(51) Int. Cl.
*G06F 19/00* (2006.01)
(52) U.S. Cl. ..................... 700/282; 236/49.3
(58) Field of Classification Search ............... 700/282, 700/206, 207, 209, 276, 245, 214, 248, 254; 237/28; 701/102, 190; 340/584, 501, 506; 316/691, 695, 724; 454/75, 276; 236/49.3, 236/51
See application file for complete search history.

(56) References Cited

U.S. PATENT DOCUMENTS

| | | | | |
|---|---|---|---|---|
| 6,283,380 B1* | 9/2001 | Nakanishi et al. | ........... | 236/49.3 |
| 6,862,179 B2* | 3/2005 | Beitelmal et al. | ........... | 361/687 |
| 6,868,682 B2* | 3/2005 | Sharma et al. | ................ | 62/180 |
| 7,033,267 B2* | 4/2006 | Rasmussen | ................ | 454/184 |
| 7,222,204 B2* | 5/2007 | Athanassiadis | ............. | 710/264 |
| 7,315,448 B1* | 1/2008 | Bash et al. | .................. | 361/701 |
| 2004/0240514 A1* | 12/2004 | Bash et al. | ................ | 374/109 |
| 2004/0257766 A1* | 12/2004 | Rasmussen et al. | ......... | 361/689 |
| 2006/0168975 A1* | 8/2006 | Malone et al. | ................ | 62/180 |

* cited by examiner

*Primary Examiner*—Kidest Bahta

(57) ABSTRACT

In a method for predicting an airflow rate of at least one air delivery device, a plurality of airflow rates through the at least one air delivery device at a plurality of airflow rates of at least one air moving device are received. A conditional probabilistic model is generated with the air moving device flow rates as inputs and the airflow rates through the at least one air delivery device as outputs. Moreover, the airflow rate of the at least one air delivery device is predicted from the conditional probabilistic model.

20 Claims, 9 Drawing Sheets

METHOD FOR PREDICTING AIRFLOW RATES

BACKGROUND

A data center may be defined as a location, for instance, a room that houses computer systems arranged in a number of racks. These racks are configured to house a number of computer systems which typically include a number of printed circuit boards (PCBs), mass storage devices, power supplies, processors, micro-controllers, and semi-conductor devices, that dissipate relatively significant amounts of heat during their operation.

Air conditioning units are typically used to cool heated air and to supply the cooled air to the computer systems. The cooled air is typically supplied through a series of vent tiles positioned above a plenum that directs airflow from the air conditioning units to the vent tiles. Conventional cooling systems are typically unconcerned with the effects that the air conditioning units have on the vent tiles because cooling is provisioned based on the nameplate power ratings of all of the computer systems in the data center. This type of cooling provisioning oftentimes leads to excessive and inefficient cooling solutions. This problem is further exacerbated by the fact that in most data centers, the cooling is provisioned for worst-case or peak load scenarios. Since it is estimated that typical data center operations only utilize a fraction of their computer systems, provisioning for these types of scenarios often increases the inefficiencies found in conventional cooling systems.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to embodiments thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are systems and methods for predicting an airflow rate of at least one air delivery device. More particularly, the airflow rate of the at least one air delivery device is predicted through use of conditional probabilistic models that correlate air delivery device airflow rates with air moving device airflow rates. The conditional probabilistic models disclosed herein generally provide a distribution of probabilities that the airflow rate through the at least one air delivery device is at a certain level. In addition, from that distribution of probabilities, the most likely airflow rate through the at least one air delivery device may be determined. As such, for instance, a relatively large number of sensors to detect the airflow rates through the air delivery devices may be unnecessary as the airflow rates may be predicted through operation of the systems and methods disclosed herein. In addition, therefore, the costs associated with setting up and operating a cooling system may be substantially minimized.

Figure 1:
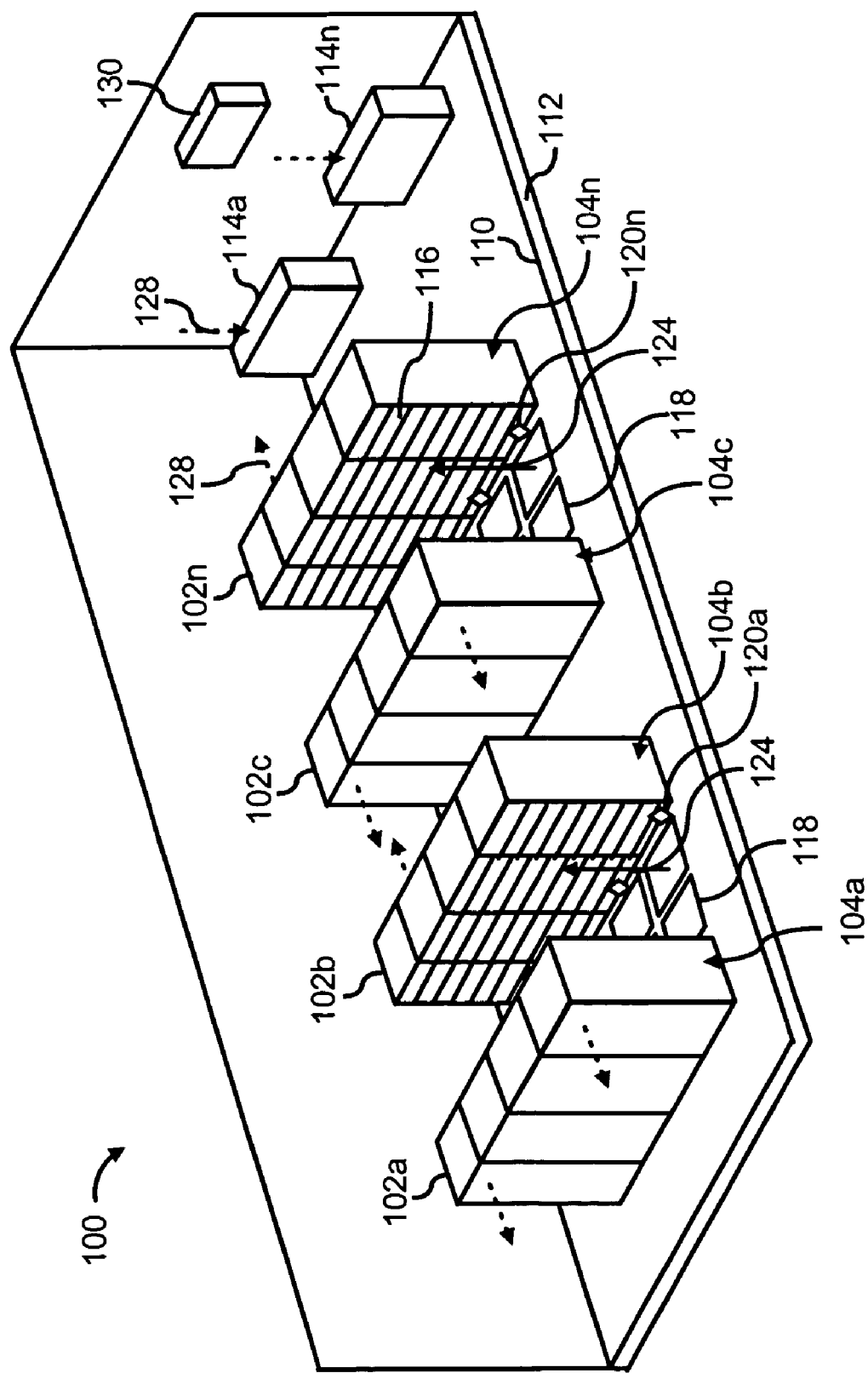
FIG. 1 shows a simplified perspective view of a data center, according to an embodiment of the invention.

With reference first to FIG. 1, there is shown a simplified perspective view of a section of a data center 100 which may employ various examples of the system for correlating and controlling at least one air delivery device disclosed herein. The terms "data center" are generally meant to denote a room or other space where one or more components capable of generating heat may be situated. In this respect, the terms "data center" are not meant to limit embodiments of the invention to any specific type of room where data is communicated or processed, nor should it be construed that use of the terms "data center" limits the invention in any respect other than its definition herein above.

The data center 100 is depicted as having a plurality of racks 102a-102n, where "n" is an integer greater than one. The racks 102a-102n may comprise, for instance, electronics cabinets configured to house electronic components 116, for instance, processors, micro-controllers, high-speed video cards, memories, semiconductor devices, and the like. The components 116 may be elements of a plurality of subsystems (not shown), for instance, computers, servers, bladed servers, etc. The subsystems and the components may be operated to perform various electronic functions, for instance, computing, switching, routing, displaying, and the like.

The racks 102a-102n are depicted as being positioned on a raised floor 110, which may function as a plenum for delivery of cooled air from one or more air moving devices 114a-114n. The air moving devices 114a-114n, where "n" is an integer greater than one, generally operate to supply airflow into a space 112 beneath a raised floor 110, and in certain instances to cool heated air (indicated by the arrows 128). In addition, the air moving devices 114a-114n may supply the electronic components 116 housed in the racks 102a-102n with airflow that has been cooled, through any reasonably suitable known manners and may thus comprise widely available, conventional air conditioning (AC) units. For instance, the air moving devices $114a$-$114n$ may comprise vapor-compression type air conditioning units, chiller type air conditioning units, etc. Examples of suitable air moving devices $114a$-$114n$ may be found in co-pending and commonly assigned U.S. patent application Ser. No. 10/853,529, filed on May 26, 2004, and entitled "Energy Efficient CRAC Unit Operation," the disclosure of which is hereby incorporated by reference in its entirety.

The air moving devices $114a$-$114n$ also include respective actuators (not shown) configured to manipulate a characteristic of the cooled airflow supplied to the racks $102a$-$102n$. The actuators include, for instance, devices for controlling airflow temperature, such as chillers, heat exchangers, etc., and devices for controlling the supply flow rates, such as variable frequency devices, etc., of the cooled air. The cooled air, indicated by the arrows 124, may be delivered from the space 112 to the racks $102a$-$102n$ through air delivery devices 118 located between some or all of the racks $102a$-$102n$. The air delivery devices 118 may comprise, for instance, ventilation tiles, variable airflow volume devices, etc., and are shown as being located between rows $104a$ and $104b$ and $104c$ and $104d$. Although the air delivery devices 118 and the space 112 have been depicted as being located on a floor of the data center 100, it should be understood that the air delivery devices 118 and the space 112 may be positioned on the ceiling or a wall of the data center 100 without departing from a scope of the invention.

In any regard, the cooled air contained in the space 112 may include cooled air supplied by one or more air moving devices $114a$-$114n$. Thus, characteristics of the cooled air, such as, temperature, pressure, humidity, flow rate, etc., may substantially be affected by the operations of a plurality of the air moving devices $114a$-$114n$. In this regard, characteristics of the cooled air at various areas in the space 112 and the cooled air supplied to the racks $102a$-$102n$ may vary, for instance, due to mixing of the cooled air. In other words, the characteristics of the cooled air supplied to a particular location in the data center 100 may differ from that of the cooled air supplied by a single air moving device $114a$. In addition, the characteristics of the cooled air supplied through the air delivery device 118 are affected by the characteristics of air flowing through the other air delivery devices 118.

Through operation of the systems and methods described below, conditional probabilistic models, such as Bayesian models, may be developed and employed to predict the airflow rates supplied through the air delivery devices 118 with the rates at which airflow is supplied by the air moving devices $114a$-$114n$. In one respect, the conditional probabilistic models disclosed herein generally enable the airflow rates supplied through the air delivery devices 118 to be relatively accurately predicted. As such, for instance, a relatively large number of airflow rate sensors, such as anemometers, are not required to determine the airflow rates supplied through the air delivery devices 118. Various manners in which the conditional probabilistic models are developed and employed are described herein below.

The conditional probabilistic models may be developed and employed by a controller 130, which is configured to perform various functions in the data center 100. Some of the functions of the controller 130 are described in greater detail herein below. Although the controller 130 is illustrated in FIG. 1 as comprising a component separate from the components 116 housed in the racks $102a$-$102n$, the controller 130 may comprise one or more of the components 116 without departing from a scope of the data center 100 disclosed herein. In addition, or alternatively, the controller 130 may comprise software configured to operate on a computing device, for instance, one of the components 116.

Figure 2:
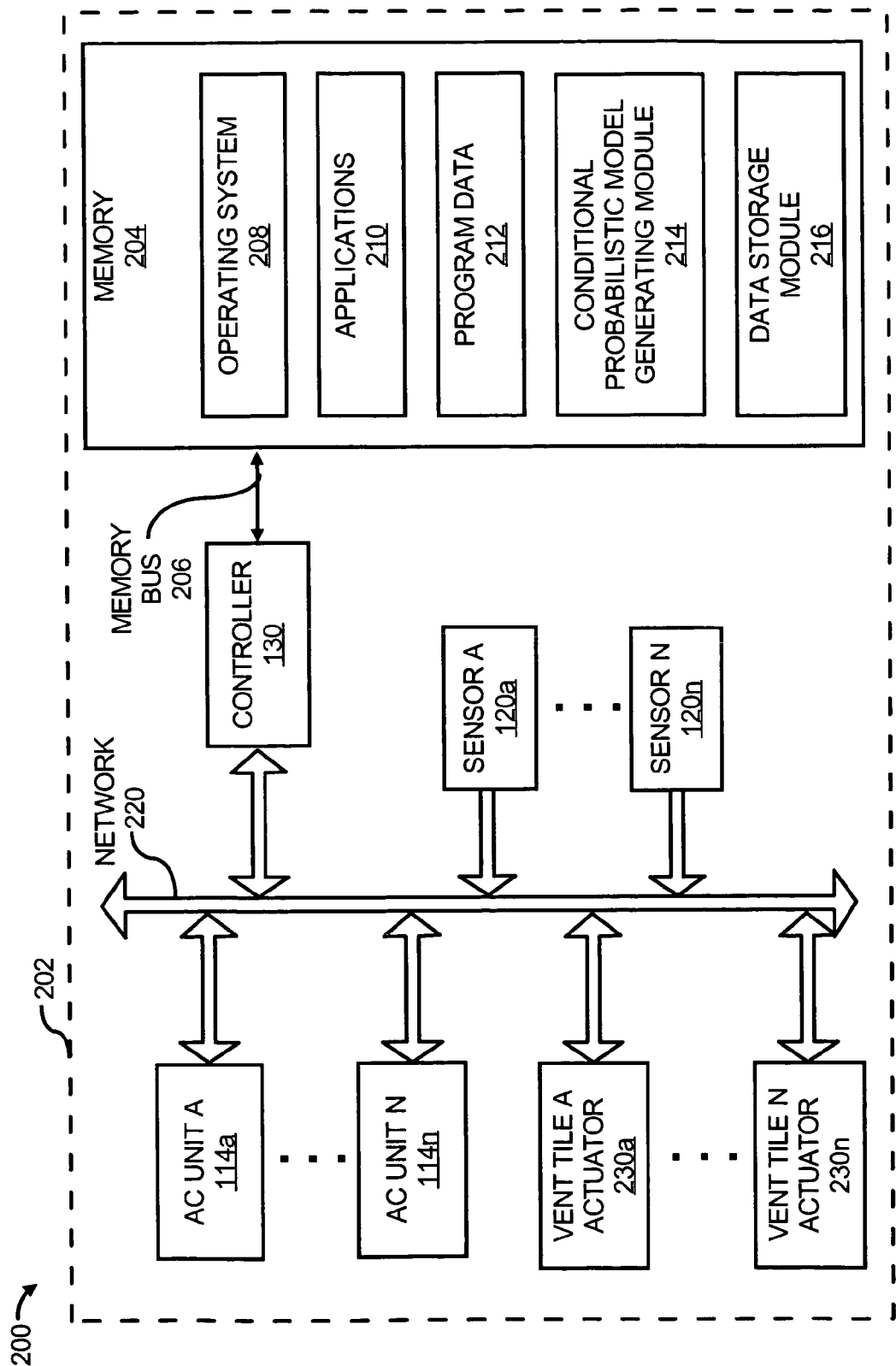
FIG. 2 is a block diagram of an air delivery device correlation and control system according to an embodiment of the invention.

Turning now to FIG. 2, there is shown a block diagram 200 of an air delivery device correlation and control system 202. It should be understood that the following description of the block diagram 200 is but one manner of a variety of different manners in which such an air delivery device correlation and control system 202 may be configured. In addition, it should be understood that the air delivery device correlation and control system 202 may include additional components and that some of the components described herein may be removed and/or modified without departing from a scope of the air delivery device correlation and control system 202. For instance, the air delivery device correlation and control system 202 may include any number of sensors, memories, processors, air moving devices, vent tiles, etc., as well as other components, which may be implemented in the operations of the air delivery device correlation and control system 202.

Although the air delivery device correlation and control system 202 has been described as being capable of performing both air delivery device correlation and air delivery device control operations, it should be understood that the air delivery device correlation and control system 202 may perform either of these operations without necessarily performing the other of these operations. For instance, the air delivery device correlation and control system 202 may perform a air delivery device correlation operation without performing a air delivery device control operation. In situations where the air delivery devices 118 are not controlled by the controller 130, for example, a user may manually adjust the air delivery devices 118 according to the relationships between the air delivery devices 118 and the air moving devices $114a$-$114n$ determined by the controller 130. In addition, or alternatively, the air delivery device correlation and control system 202 may perform an air delivery device control operation without performing an air delivery device correlation operation, for instance, when the air delivery device correlation operation has previously been performed.

As shown, the air delivery device correlation and control system 202 includes the controller 130 depicted in FIG. 1, which may comprise a computing device, for instance, a computer system, a server, etc. In addition, the controller 130 may comprise a microprocessor, a micro-controller, an application specific integrated circuit (ASIC), and the like, configured to perform various processing functions. In addition, or alternatively, the controller 130 may comprise software operating in any of a number of computing devices.

The controller 130 is illustrated as being in communication with a memory 204 through a memory bus 206. However, in certain instances, the memory 204 may form part of the controller 130 without departing from a scope of the air delivery device correlation and control system 202. Generally speaking, the memory 204 may be configured to provide storage of software, algorithms, and the like, that provide the functionality of the controller 130. By way of example, the memory 204 may store an operating system 208, application programs 210, program data 212, and the like. In this regard, the memory 204 may be implemented as a combination of volatile and non-volatile memory, such as DRAM, EEPROM, MRAM, flash memory, and the like. In addition, or alternatively, the memory 204 may comprise a device configured to read from and write to a removable media, such as, a floppy disk, a CD-ROM, a DVD-ROM, or other optical or magnetic media.

The memory 204 may also store a conditional probabilistic model generating model 214, which the controller 130 may invoke to generate conditional probabilistic models configured to enable predictions of the airflow rates through the air delivery devices 118 to be made. The conditional probabilistic models may be employed to, for instance, predict the effects that varying the flow rates of air supplied by the air moving devices 114a-114n have on the air delivery devices 118. More particularly, the models may enable an estimation of the conditional probability that the air supplied through an air delivery device 118 is flowing at a certain rate given the amount that the air delivery devices 118 are opened and the rates at which airflow is supplied by the air moving devices 114a-114n. Other factors, such as the plenum 112 infrastructure, may also be considered in estimating the conditional probabilities of the rates at which air flows through the air delivery devices 118.

A reasonably suitable conditional probabilistic model includes a Bayesian network based upon Gaussian or discrete distributions. Generally speaking, the Bayesian network or a Bayesian belief network is a directed acyclic graph of nodes representing variables and arcs representing dependence relationships between the variables.

Figure 3:
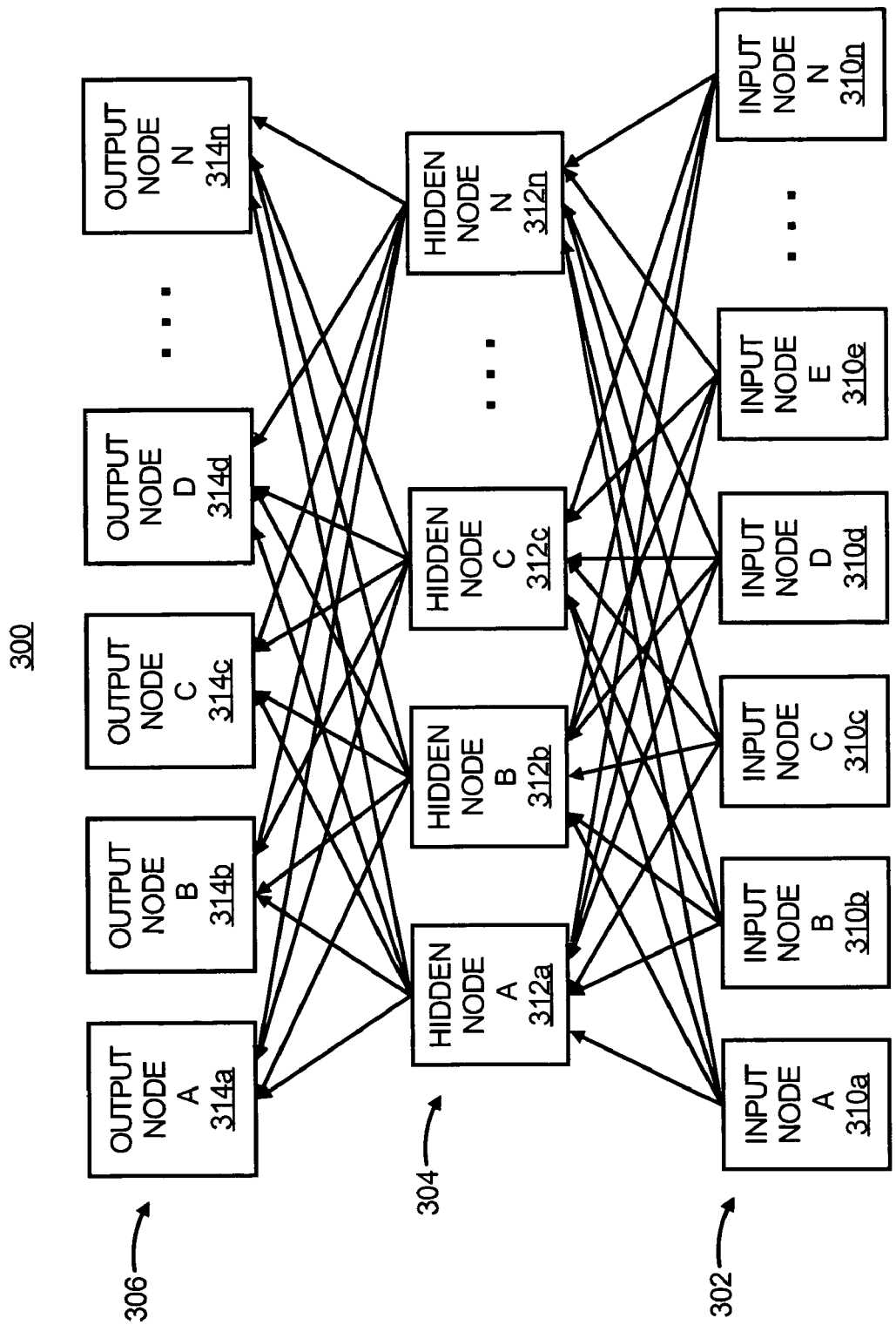
FIG. 3 illustrates a diagram of a conditional probabilistic model that substantially correlates air delivery devices and air moving devices, according to an embodiment of the invention.

A diagram of a conditional probabilistic model 300 that may be generated by the controller 130 is depicted in FIG. 3. The model 300 is a representation of the joint distribution over all the variables represented by the nodes depicted in the diagram of FIG 3. In this regard, the model 300 includes an input layer 302, a hidden layer 304, and an output layer 306. The input layer 302 includes input nodes A-N 310a-310n, the hidden layer 304 includes hidden nodes A-N 312a-312n, and the output layer 306 includes output nodes A-N 314a-314n, where "n" is an integer greater than one. The ellipses ". . ." positioned between various nodes in the model 300 generally indicate that the model 300 may include any reasonably suitable number of additional nodes.

The input nodes 310a-310n may represent various flow rates of the air moving devices 114a-114n. The output nodes 314a-314n may represent the rates at which air flows through the air delivery devices 118, which may be determined through actual measurements or through computational fluid dynamics modeling. In one example, the airflow rates through the air delivery devices 118 for various air moving device 114a-114n settings may be fed into the controller 130 from a plurality of sensors 120a-120n over a network 220. The network 220 generally represents a wired or wireless structure in the data center 100 for the transmission of data between the various components of the air delivery device correlation and control system 202. The network 220 may comprise an existing network infrastructure or it may comprise a separate network configuration installed for the purpose of air delivery device correlation and control by the controller 130.

The sensors 120a-120n may be configured to transmit collected data over the network 220 for storage and processing. The sensors 120a-120n may comprise sensors configured to detect at least one environmental condition at various locations in the data center 100 (FIG. 1). The at least one environmental condition may comprise mass flow rates of air supplied through the air delivery devices, velocities of air supplied through the air delivery devices, airflow temperature, absolute humidity or pressure. As shown in FIG. 1, the sensors 120a-120n are represented as diamonds to distinguish them from other elements depicted in FIG. 1. In addition, the sensors 120a-120n are depicted as being positioned to detect the at least one condition at the inlets of the racks 102a-102n. The sensors 120a-120n may, however, be positioned at various other locations, such as, within the racks 102a-102n. In this example, the sensors 120a-120n may comprise sensors 120a-120n associated with one or more of the electronic components 116.

In another example, the at least one condition may be calculated through use of any reasonably suitable computational fluid dynamics (CFD) modeling algorithm. In this example, the CFD modeling algorithm may be implemented by the controller 130 to calculate that at least one condition, such as, the flow rates of air supplied through the air delivery devices 118 based upon the configuration of the data center 100 as well as other considerations, such as, airflow characteristics in the data center 100.

In any regard, the controller 130 may use the determined flow rates of air supplied through the air delivery devices 118 as the initial output nodes 314a-314n into the conditional probabilistic model generation module 214, which may employ the initial output nodes 314a-314n to develop the model 300 of the initial relationships between the air moving devices 114a-114n settings and the airflow rates through the air delivery devices 118. Based upon the initial relationships between the air moving device 114a-114n flow rates and the air delivery device 118 flow rates, the controller 130 may generate the conditional probabilities of additional output nodes 314a-314n. For example, the controller 130 may implement the Chain rule of probability to generate the conditional probabilities of the output nodes 314a-314n. In addition, the controller 130 may use, for instance, the Bayes rule of conditional probability to infer each air delivery device 118 airflow rate from air moving device 114a-114n airflow rates.

By way of example, let the variables $X(i)$, where $i=1$ to $n$, be the airflow rates through the air delivery devices 118 and the parents($X(i)$) be the airflow rates supplied from the air moving devices 114a-114n. In this relationship, the parents (A) are the parents of node A. In addition, the joint distribution for $X(1)$ to $X(n)$ is represented as the product of the probability distributions $p(X(i)|parents(X(i)))$ for i from 1 to n.

In addition, the number of nodes 310a-310n, 312a-312n, and 314a-314n per layer 302-306 may be modified to increase the accuracy of the model 300 depicted in FIG. 3. By way of example, the number of hidden nodes 312a-312n, which may represent the amounts that the air delivery devices 118 are open, the plenum infrastructure (such as, the plenum depth, locations of the AC units 114a-114n, etc.), etc., may be increased to thereby increase the complexity in the relationship between the input nodes 310a-310n and the output nodes 314a-314n. The final model 300 may comprise layers 302-306 of nodes 310a-310n, 312a-312n, and 314a-314n representing variables and arcs representing dependence relationships between the variables.

In one respect, the model 300 may be employed to predict the flow rates of the air delivery devices 118 that were not determined for the initial input into the conditional probabilistic model generating module 214. As such, the controller 130 may implement the model 300 to predict air delivery device 118 flow rates for various air moving device 114a-114n flow rates and air delivery device 118 settings. More particularly, the controller 130 may predict the flow rates of air supplied through the air delivery devices 118 in terms of a distribution of different airflow rates. The distribution of airflow rates may be normal, discrete, or continuous, and a Gaussian may be employed on the distribution of airflow rates. In one example, the controller 130 may select a mean of the distribution of airflows as the airflow rate of a particular air delivery device 118.

In addition, or alternatively, each of the nodes 310a-310n and 314a-314n may have discretized states that are mutually exclusive and exhaustive. In one regard, the nodes 310a-310n and 314a-314n may have discretized states to substantially reduce the amount of computational and storage capacity required to generate the model 300. By way of example, the discretized states may include low, medium, and high airflow rates.

For example, the controller 130 may implement the model 300 to predict that the airflow rate through an air delivery device 118 is "high" approximately 90% of the time and is "medium" approximately 10% of the time when the air moving devices 114a-114n are operating at 75% of their rated capacities. In this example, the model 300 may indicate that the airflow rate through the air delivery device 118 is most likely "high" when the air moving devices 114a-114n are operating at the 75% level. As such, the controller 130 may output an indication that the airflow rate through the air delivery device 118 is "high".

The controller 130 may implement the data storage module 216 to store various data in a data storage location in the memory 204. The data storage module 216 may be implemented to store the model 300 to thereby store the correlations between the air delivery devices 118 and the air moving devices 114a-114n. In addition, the controller 130 may access the model 300 stored in the data storage module 216 to predict how one or more air delivery devices 118 are expected to respond based upon various air moving device 114a-114n and air delivery device 118 settings.

According to an example, the predicted airflow rates may be employed to evaluate the operational statuses of the air delivery devices 118 and the air moving devices 114a-114n. In this example, the airflow rate supplied through an air delivery device 118 may be detected and compared with the airflow rate predicted from the model 300. If a discrepancy between these airflow rates exists or if the discrepancy exceeds a predetermined level, the controller 130 may determine that the either or both of the air delivery device 118 and an air moving device 114a-114n is not operating properly. In addition, or alternatively, the controller 130 may determine that the airflow supplied between the air moving device 114a and the air delivery device 118 is substantially unobstructed or remains unchanged. As such, the controller 130 may implement the model 300 as a means for troubleshooting the cooling system components as well as airflow in the data center 100.

According to another example, the controller 130 may implement the predicted airflow rates to control air delivery devices 118. In this example, the controller 130 may predict from the model 300 that the mass flow rate of air supplied through a particular air delivery device 118 will be insufficient based upon the mass flow rates of air supplied by the air moving devices 114a-114n and the amounts that the other air delivery devices 118 are open. In response, the controller 130 may vary the openings of one or more of the air delivery devices 118 to substantially ensure that the mass flow rate of air supplied through the particular air delivery device 118 is sufficient. Thus, for instance, the controller 130 may transmit control signals over the network 220 to one or more air delivery device actuators 230a-230n to vary the airflow rates supplied through respective ones of the air delivery devices 118. As another example, the controller 130 may transmit control signals to one or more of the air moving devices 114a-114n to vary the airflow outputs of the one or more air moving devices 114a-114n.

According to a further example, the model 300 may be extended to include energy efficiency and thermal management metrics, such as, supply heat index (SHI), which is described in co-pending and commonly assigned U.S. patent application Ser. No. 10/446,854, filed on May 29, 2003, and entitled "Air Re-Circulation Index", the disclosure of which is hereby incorporated by reference in its entirety. By way of example, the airflow rates predicted from the model 300 may be checked against a flow rate that would be necessitated using the energy efficiency or thermal management metrics to perform a thermal management function as described above.

Figure 4:
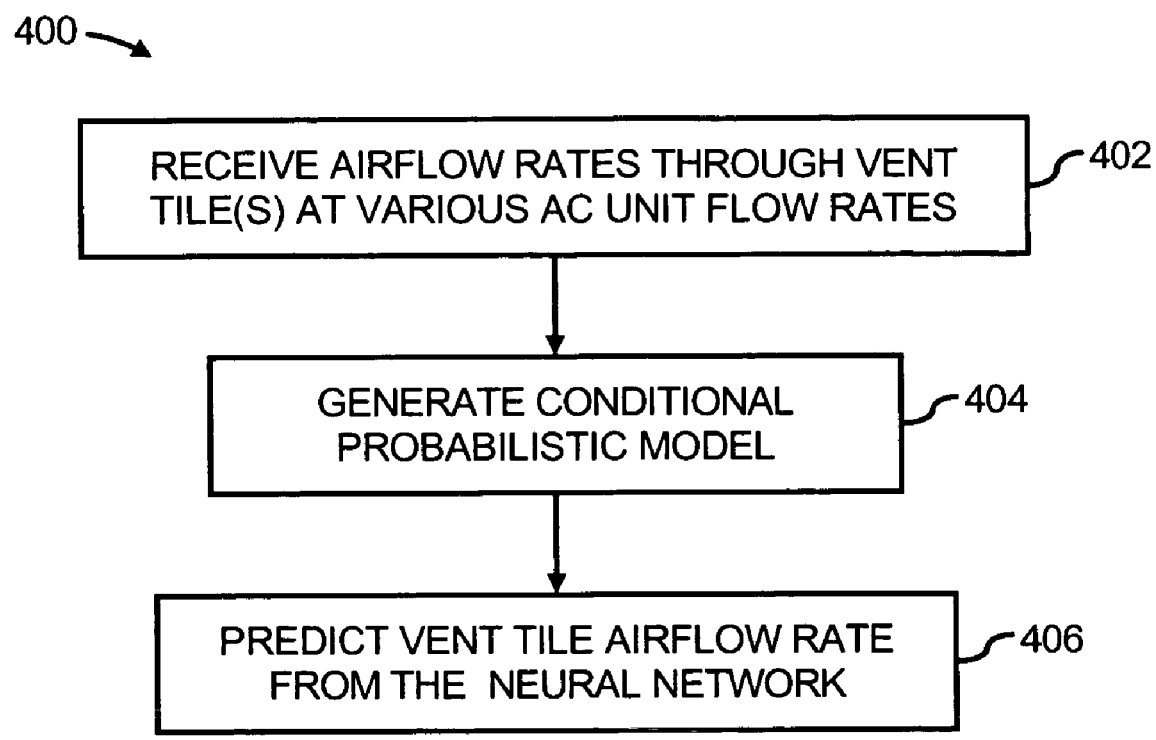
FIG. 4 illustrates a flow diagram of a method for predicting an airflow rate of at least one air delivery device based upon an airflow rate of at least one air moving device, according to an embodiment of the invention.

With particular reference now to FIG. 4, there is shown a flow diagram of a method 400 for predicting an airflow rate of at least one air delivery device 118 based upon an airflow rate of at least one air moving device 114a-114n, according to an example. It is to be understood that the following description of the method 400 is but one manner of a variety of different manners in which an example of the invention may be practiced. It should also be apparent to those of ordinary skill in the art that the method 400 represents a generalized illustration and that other steps may be added or existing steps may be removed, modified or rearranged without departing from a scope of the method 400.

The description of the method 400 is made with reference to the block diagram 200 illustrated in FIG. 2, and thus makes reference to the elements cited therein. It should however, be understood that the method 400 is not limited to the elements set forth in the block diagram 200. Instead, it should be understood that the method 200 may be practiced by a system having a different configuration than that set forth in the block diagram 200.

The method 400 may be implemented to predict a rate at which air flows through one or more air delivery devices 118. As described above, the airflow rates may be predicated to determine whether cooling system components in a data center 100 are operating correctly. In addition, or alternatively, the airflow rates may be predicted as part of a thermal management operation for controlling the cooling air supplied to the electronic components 116.

The method 400 may be performed in response to any of a number of stimuli or conditions. For instance, the method 400 may be initiated with activation of components, such as, the air moving devices 114a-114n. In addition, or alternatively, the method 400 may be manually initiated or the controller 130 may be programmed to initiate the method 400 at various times, for a set duration of time, substantially continuously, etc. By way of example, the method 400 may be performed after a data center 100 has been activated, after components in a data center 100 have been added, moved or removed.

At step 402, the controller 130 may receive a plurality of flow rates of air supplied through at least one air delivery device 118 at a plurality of flow rates of air supplied by at least one air moving device 114a-114n. This information may be received directly from sensors 120a-120n as described in greater detail herein below with respect to FIG. 5A. In addition, or alternatively, this information may be received from computations performed by a CFD modeling algorithm, as described in greater detail herein below with respect to FIG. 5B.

In any regard, the controller 130 may generate a conditional probabilistic model as described above with respect to FIGS. 2 and 3, at step 404. More particularly, the controller 130 may invoke the conditional probabilistic model generating module 214 to generate the conditional probabilistic model 300 with the air moving device 114a-114n airflow rates as the input nodes 310a-310n and the airflow rates through the at least one air delivery device 118 as the output nodes 314a-314n, as also described herein above.

At step 406, the controller 130 may predict the airflow rate of the at least one air delivery device 118 from the model 300. In other words, given a set of conditions, such as, the flow rates of air supplied by the at least one air moving device 114a-114n, the amounts that the air delivery devices 118 are open, the plenum infrastructure, etc., the controller 130 may employ the model 300 to predict the flow rate of air supplied through the at least one air delivery device 118. More particularly, for instance, the controller 130 may determine a probability distribution that the airflow rate supplied through the at least one air delivery device 118 is at a certain level from the model 300 based upon, for instance, the flow rates at which air is supplied by the air moving devices 114a-114n. In addition, from the probability distribution, the controller 130 may select an airflow rate, such as, the mean of the probability distribution, as the predicted air delivery device 118 flow rate.

According to an example, the air delivery device 118 airflow rate predictions may be characterized in discrete states. In this regard, for instance, the controller 130 may predict the probability that the airflow rate through the at least one air delivery device 118 is one of a plurality of discrete states, such as, low, low-medium, medium, medium-high, high, etc.

Figure 5A:
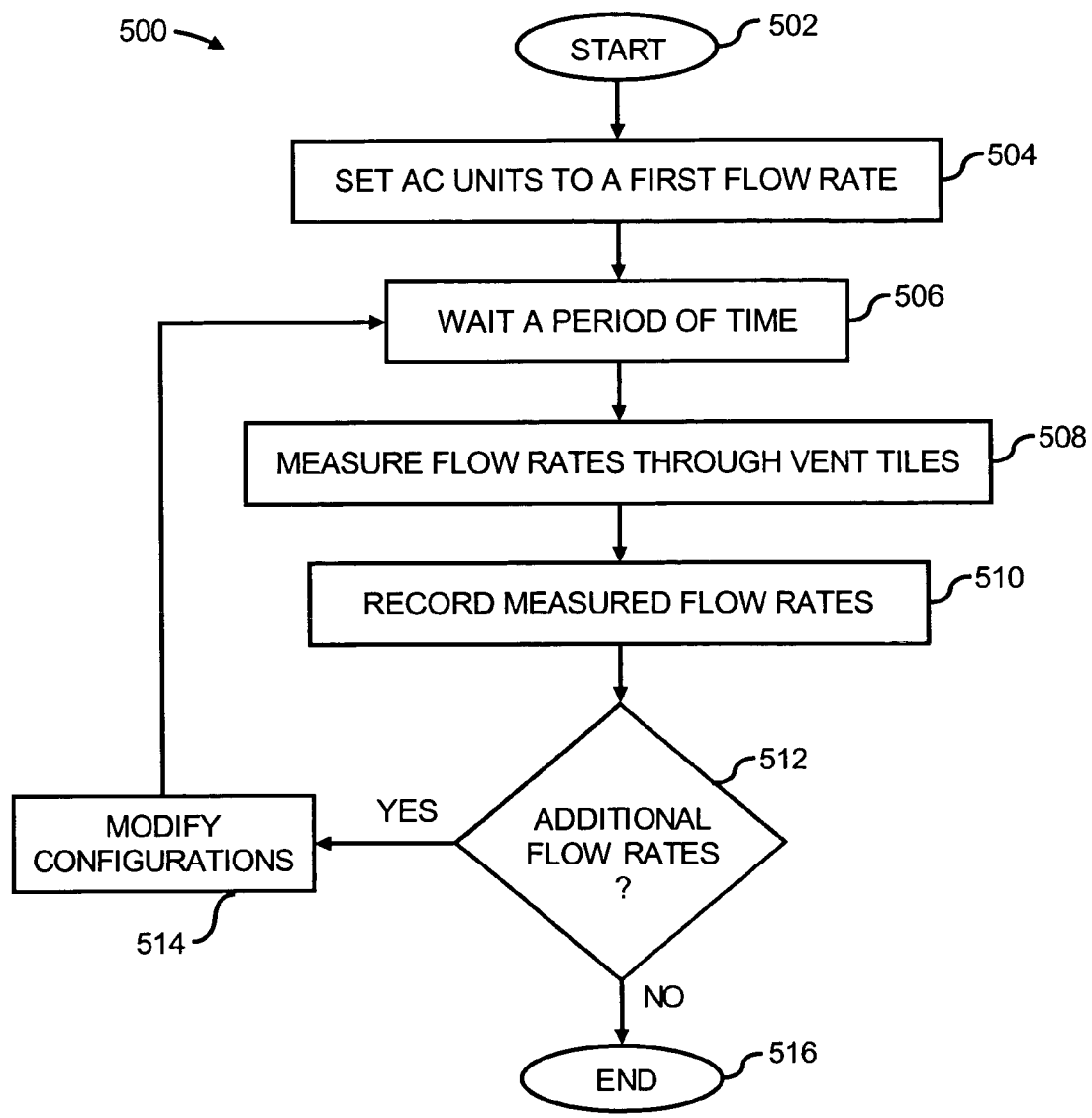
FIGS. 5A and 5B show flow diagrams of respective methods for generating the plurality of airflow rates received by a controller in the method depicted in FIG. 4, according to embodiments of the invention.
Figure 5B:
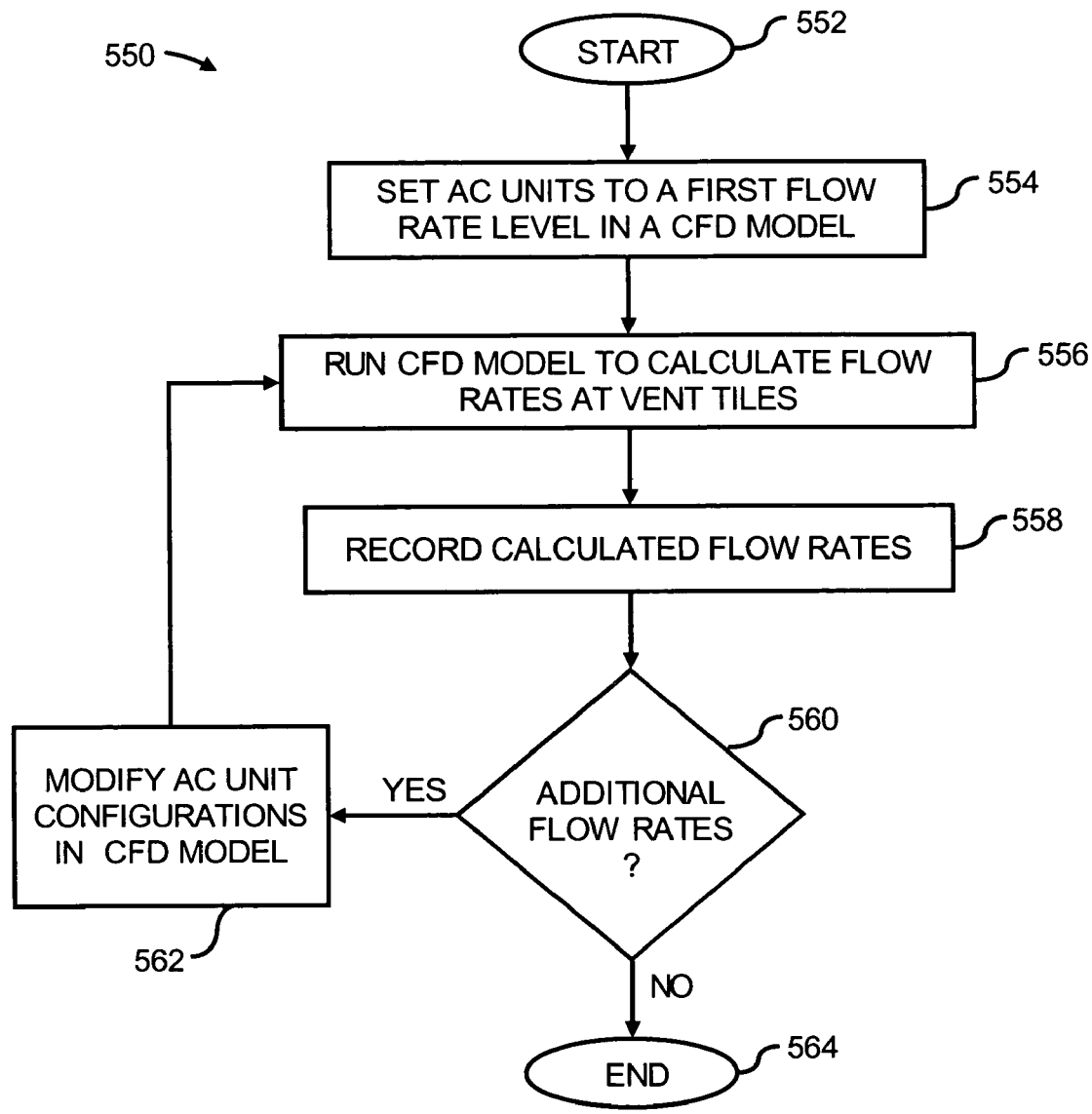

Turning now to FIGS. 5A and 5B, there are shown flow diagrams of two respective methods 500, 550 for generating the plurality of airflow rates received by the controller 130 at step 402. In the method 500, the data center 100 may be considered as having a sufficient number of sensors 120a-120n for the flow rates through the air delivery devices 118 to be either directly measured or indirectly calculated from other measured conditions. In the method 550, a CFD modeling algorithm is employed to calculate the flow rates, which may be necessary in data centers 100 having insufficient numbers of suitable sensors 120a-120n. Although the methods 500 and 550 have been depicted as comprising separate methods. It should be understood that various steps described with respect to both of the methods 500 and 550 may be performed substantially concurrently. For instance, the method 500 may be performed for certain parts of the data center 100, whereas the method 550 may be performed for other parts of the data center 100. In addition, or alternatively, both methods 500 and 550 may be performed to obtain the flow rates.

With particular reference first to FIG. 5A, the method 500 may be initiated at step 502 in response to any of a number of stimuli or conditions. For instance, the method 500 may be initiated when it is desired to generate the model 300.

Once initiated, the air moving devices 114a-114n may be set to supply airflow at a first flow rate as indicated at step 504. The first flow rate for the air moving devices 114a-114n may be the same for each of the air moving devices 114a-114n or they may differ for the air moving devices 114a-114n. In this regard, the term "first" is used to indicate an initial flow rate for each of the respective air moving devices 114a-114n.

In any regard, at step 506, a period of time may be allowed to elapse to enable the airflow through the plenum 112 and through the air delivery devices 118 to substantially stabilize. Following elapse of the period of time, the rates of airflow through the air delivery devices 118 are measured, as indicated at step 508. In addition, the measured flow rates are recorded, as indicated at step 510.

At step 512, it may be determined as to whether additional air delivery device 118 flow rates are to be recorded. If "yes", then one or both of the air moving device 114a-114n flow rates and the air delivery device 118 openings may be modified at step 514, and steps 506-512 may be repeated to record the flow rates through the air delivery devices 118 at the modified configuration. In addition, steps 506-514 may be repeated for any reasonably suitable number of times depending upon the level of accuracy desired in predicting the flow rates contrasted with the amount of time and computational capacity required to develop the model 300 with the number of recorded flow rates.

Once the desired number of measured flow rates has been recorded, the method 500 may end as indicated at step 516. In addition, the recorded flow rates may be received by the controller as indicated at step 402 (FIG. 4) such that the airflow rate through the air delivery devices 118 may be predicted as described above with respect to the method 400.

With particular reference now to FIG. 5B, the method 550 may be initiated at step 552 in response to any of a number of stimuli or conditions. For instance, the method 550 may be initiated when it is desired to generate the model 300.

Once initiated, the air moving devices 114a-114n may be set in a CFD model to supply airflow at a first flow rate as indicated at step 554. The first flow rate for the air moving devices 114a-114n may be the same for each of the air moving devices 114a-114n or they may differ for the air moving devices 114a-114n. In this regard, the term "first" is used to indicate an initial flow rate for each of the respective air moving devices 114a-114n.

At step 556, the CFD model may be run to calculate the rates at which air flows through the air delivery devices 118. In addition, the calculated flow rates are recorded, as indicated at step 558.

At step 560, it may be determined as to whether additional air delivery device 118 flow rates are to be recorded. If "yes", then one or both of the air moving device 114a-114n flow rates and the air delivery device 118 openings may be modified in the CFD model at step 562, and steps 556-560 may be repeated to record the flow rates through the air delivery devices 118 at the modified configuration. In addition, steps 556-560 may be repeated for any reasonably suitable number of times depending upon the level of accuracy desired in estimating the flow rates contrasted with the amount of time and computational capacity required to develop the model 300 with the number of recorded flow rates.

Once the desired number of calculated flow rates has been recorded, the method 550 may end as indicated at step 564. In addition, the recorded flow rates may be received by the controller as indicated at step 402 (FIG. 4) such that the airflow rates through the air delivery devices 118 may be predicted as described above with respect to the method 400.

Figure 6A:
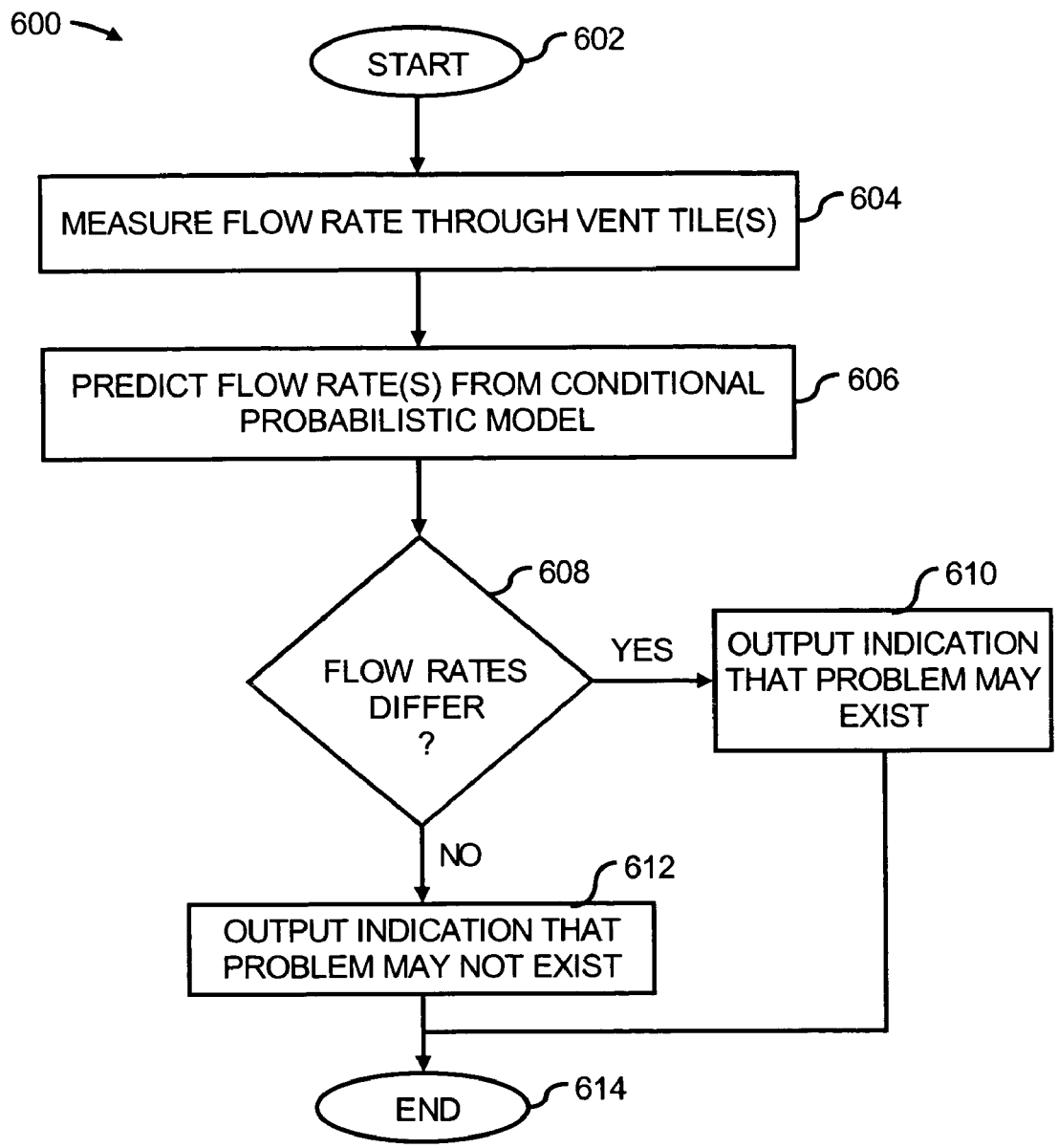
FIG. 6A depicts a flow diagram of a method for determining whether one or more cooling system components are operating properly through operation of the method depicted in FIG 4, according to an embodiment of the invention.

According to an example, the air delivery device 118 flow rates predicted through operation of the method 400 (FIG. 4) may be used to determine whether one or more of the cooling system components in the data center 100 are operating properly. In addition, or alternatively, the predicted air delivery device 118 flow rates may be employed to determine whether a blockage has occurred in the plenum between the air moving devices 114a-114n and one or more of the air delivery devices 118. These examples are depicted in the flow diagram illustrating the method 600 in FIG. 6A.

The method 600 may be initiated at step 602 in response to any of a number of stimuli or conditions. For instance, the method 600 may be initiated when it is desired to check on the operational status of the cooling system components in the data center 100, which may include a determination as to whether a blockage in the airflow supply to the air delivery devices 118 may have occurred.

At step 604, the flow rates through one or more air delivery devices 118 may be measured through use of the sensors 120a-120n. In addition, the predicted flow rates for the one or more air delivery devices 118 may be determined from the model 300 at step 606. The measured and predicted flow rates may be compared at step 608 to determine whether they differ from one another. The determination at step 608 may also be based upon whether the difference between the flow rates exceed a predetermined level to, for instance, substantially prevent minor differences from triggering an error message.

If a difference exists between the flow rates or if the difference exceeds the predetermined level, an indication that a problem may exist somewhere among the cooling system components may be outputted, as indicated at step 610. The problem may include, for instance, a malfunctioning air moving device 114a, an improperly positioned air delivery device 118, a blockage in the plenum 112, etc. Alternatively, however, if a difference between the flow rates does not exist or if the difference falls below the predetermined level, an indication that a problem may not exist may be outputted, as indicated at step 610. In addition, the method 600 may end as indicated at step 614 following either step 612 or 614.

Figure 6B:
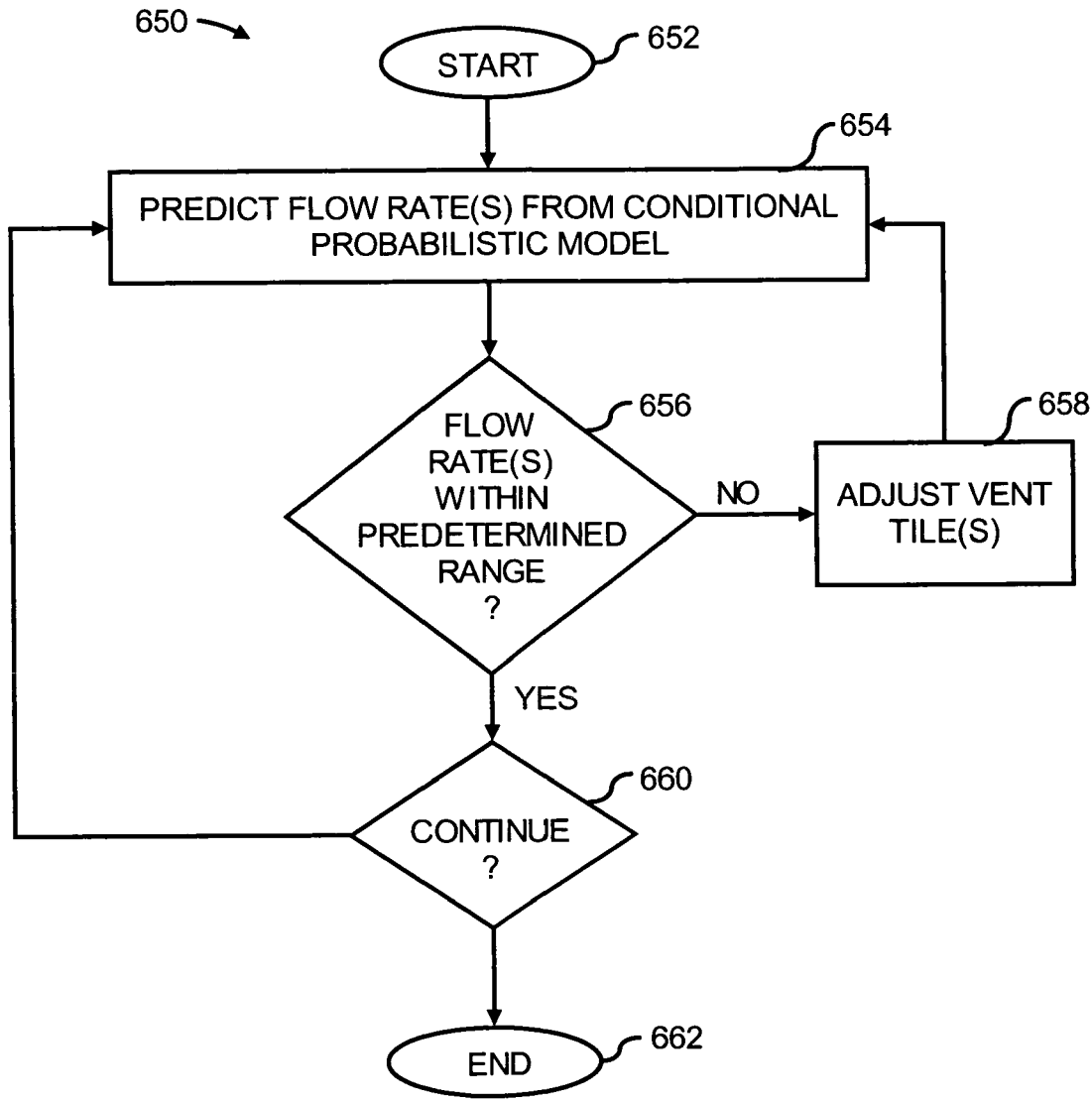
FIG. 6B depicts a flow diagram of a method for controlling air delivery devices through operation of the method depicted in FIG. 4, according to an embodiment of the invention.

According to another example, the air delivery device 118 flow rates predicted through operation of the method 400 (FIG. 4) may be used to control the air delivery devices 118. This example is depicted in the flow diagram illustrating the method 650 in FIG. 6B.

The method 650 may be initiated at step 652 in response to any of a number of stimuli or conditions. For instance, the method 650 may be initiated upon activation of one or more cooling system components, manually initiated, etc.

At step 654, the predicted flow rates for the one or more air delivery devices 118 may be determined from the model 300 at step 654. For instance, predicted flow rates may be determined based upon the current flow rates of air supplied by the air moving devices 114a-114n and the amounts to which the air delivery devices 118 are open as described above.

At step 656, a determination as to whether the predicted flow rates are within predetermined ranges may be determined. The predetermined ranges may include, for instance, the desired or needed levels of airflow supply delivered to the electronic components 116 through the one or more air delivery devices 118.

If it is determined that one or more of the predicted flow rates is outside of the predetermined range, the controller 130 may adjust one or more of the air delivery devices 118 to attempt to bring the flow rates within the predetermined range, as indicated at step 658. The adjustments may include an increase in the openings of one or more of the air delivery devices 118 and/or a decrease in the openings of one or more of the air delivery devices 118. In addition, following adjustment of one or more of the air delivery devices 118, the predicted flow rates may be determined again at step 654 and the predicated flow rates may again be compared with the predetermined range 656. In this regard, the air delivery device 118 openings may be adjusted in an iterative manner until the predicted flow rates are with the predetermined range.

Following the "yes" condition at step 656, it may be determined as to whether the method 650 is to be continued at step 660. The method 650 may be continued to thereby substantially monitor and adjust the air delivery devices 118 to generally ensure, for instance, that the cooling airflow is adequately supplied to the electronic components 116, that the cooling airflow is distributed in a relatively energy efficient manner, that the cooling airflow is supplied through the air delivery devices 118 in a substantially optimized manner, etc. If it is determined that the method 650 is to continue at step 660, steps 654-660 may be repeated for any desired length of time. If, on the other hand, it is determined that the method 650 is to be discontinued, the method 650 may end as indicated at step 662.

The outcomes of either or both of the methods 600 and 650 may be employed to determine whether another conditional probabilistic model 300 is to be generated. For instance, if either of the methods 600 indicated that a change in the data center 100 has occurred, for example, a relatively large blockage is placed in the floor plenum, which disrupts the relationships between the air moving devices 114a-114n and the air delivery devices 118, the conditional probabilistic model 300 may be generated again as described with respect to the method 400 (FIG. 4).

Some or all of the operations set forth in the methods 400, 500, 550, 600, and 650 may be contained as a utility, program, or subprogram, in any desired computer accessible medium. In addition, some or all of the operations in the methods 400, 500, 550, 600, and 650 may be embodied by a computer program, which may exist in a variety of forms both active and inactive. For example, it may exist as software program (s) comprised of program instructions in source code, object code, executable code or other formats. Any of the above may be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general, It is therefore to be understood that any electronic device capable of executing the above-described functions may perform those functions enumerated above.

Figure 7:
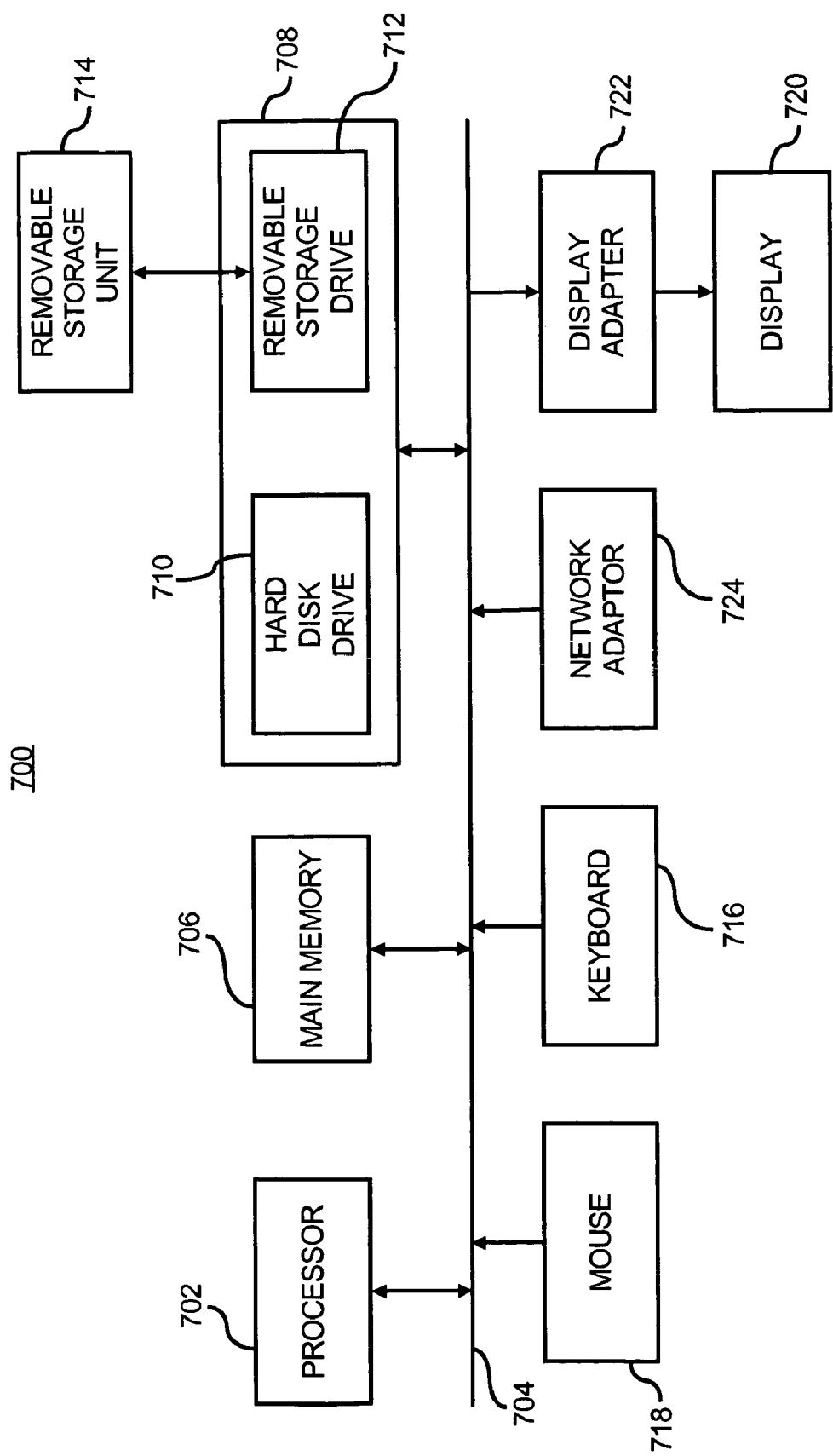
FIG. 7 illustrates a computer system, which may be employed to perform the various functions of the air delivery device correlation and control system, according to an embodiment of the invention.

FIG. 7 illustrates a computer system 700, which may be employed to perform the various functions of the controller 130 described hereinabove, according to an embodiment. In this respect the computer system 700 may be used as a platform for executing one or more of the functions described hereinabove with respect to the controller 130.

The computer system 700 includes a processor 702, which may be used to execute some or all of the steps described in the methods 400, 500, 550, 600, and 650. Commands and data from the processor 702 are communicated over a communication bus 704. The computer system 700 also includes a main memory 706, such as a random access memory (RAM), where the program code for, for instance, the controller 130, may be executed during runtime, and a secondary memory 708. The secondary memory 708 includes, for example, one or more hard disk drives 710 and/or a removable storage drive 712, representing a floppy diskette drive, a magnetic tape drive, a compact disk drive, etc., where a copy of the program code for the air delivery device correlation and control system may be stored.

The removable storage drive 712 reads from and/or writes to a removable storage unit 714 in a well-known manner. User input and output devices may include a keyboard 716, a mouse 718, and a display 720. A display adaptor 722 may interface with the communication bus 704 and the display 720 and may receive display data from the processor 702 and convert the display data into display commands for the display 720. In addition, the processor 702 may communicate over a network, for instance, the Internet, LAN, etc., through a network adaptor 724.

It will be apparent to one of ordinary skill in the art that other known electronic components may be added or substituted in the computer system 700. In addition, the computer system 700 may include a system board or blade used in a rack in a data center, a conventional "white box" server or computing device, etc. Also, one or more of the components in FIG. 7 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A method for predicting a current airflow rate of at least one air delivery device, said method comprising:
   receiving a plurality of initial airflow rates through the at least one air delivery device at a plurality of initial airflow rates of at least one air moving device;
   generating a conditional probabilistic model with the initial air moving device flow rates as inputs and the initial airflow rates through the at least one air delivery device as outputs, wherein the conditional probabilistic model correlates airflow rates from air delivery devices with air moving device airflow rates; and
   predicting the current airflow rate of the at least one air delivery device from the conditional probabilistic model.

2. The method according to claim 1, wherein receiving the plurality of initial airflow rates through the at least one air delivery device further comprises receiving a plurality of initial airflow rates through the at least one air delivery device measured with a sensor.

3. The method according to claim 1, wherein receiving the plurality of initial airflow rates through the at least one air delivery device further comprises receiving a plurality of initial airflow rates through the at least one air delivery device calculated by a computational fluid dynamics model.

4. The method according to claim 1, wherein generating the conditional probabilistic model further comprises entering the amounts that additional one or more air delivery devices are open as hidden nodes in the conditional probabilistic model.

5. The method according to claim 1, wherein generating the conditional probabilistic model further comprises entering into the conditional probabilistic model, values pertaining to an infrastructure of a plenum configured to supply airflow from the at least one air moving device to the at least one air delivery device.

6. The method according to claim 1, wherein generating the conditional probabilistic model further comprises generating the conditional probabilistic model such that the predicted airflow rate of the at least one air delivery device is at least one of a plurality of discrete airflow rates.

7. The method according to claim 1, wherein generating the conditional probabilistic model further comprises generating the conditional probabilistic model to output a distribution of probable airflow rates, and wherein predicting the airflow rate of the at least one air delivery device further comprises predicting the airflow rate from the distribution of probable airflow rates.

8. The method according to claim 7, wherein predicting the airflow rate further comprises predicting the airflow rate to comprise the mean of the distribution of probable airflow rates.

9. The method according to claim 7, wherein predicting airflow rate further comprises predicting the airflow rate to comprise the probable airflow rate having the highest conditional probability.

10. The method according to claim 1, further comprising:
    controlling the at least one air delivery device to control the airflow delivered to at least one electronic component based upon the flow rate of the at least one air delivery device predicted from the conditional probabilistic model.

11. The method according to claim 10, wherein generating the conditional probabilistic model further comprises generating the conditional probabilistic model to include at least one of energy efficiency and thermal management metrics.

12. The method according to claim 1, further comprising:
    measuring the airflow rate supplied through the at least one air delivery device; and
    comparing the measured airflow rate supplied through the at least one air delivery device with an airflow rate predicted from the conditional probabilistic model to determine whether a problem exists in the airflow rate supplied through the at least one air delivery device.

13. A system for controlling at least one air delivery device, said system comprising:
    a controller configured to receive initial rates at which air flows through the at least one air delivery at a plurality of initial air moving device settings;
    said controller being further configured to invoke a conditional probabilistic model generating module configured to generate a conditional probabilistic model using the plurality of initial air moving device settings and associated initial airflow rates through the at least one air delivery device as inputs, wherein the conditional probabilistic model correlates airflow rates from air delivery devices with air moving device airflow rates; and
    wherein the controller is further configured to output a prediction of a current airflow rate supplied through the at least one air delivery device for a plurality of air moving device settings from the conditional probabilistic model.

14. The system according to claim 13, wherein the conditional probabilistic model is configured to output the conditional probabilities that the current airflow rates through the at least one air delivery device are at predetermined discrete levels, and wherein the controller is configured to implement the conditional probabilistic model to predict the current airflow rate having the highest conditional probability.

15. The system according to claim 13, wherein the controller is further configured to receive the amounts that additional air delivery devices are open, and wherein the controller is configured to enter the amounts that the additional air delivery devices are open into the conditional probabilistic model generating module to generate the conditional probabilistic model.

16. The system according to claim 13, wherein the controller is further configured to receive values pertaining to an infrastructure of a plenum configured to supply airflow from the at least one air moving device to the at least one air delivery device, and wherein the controller is configured to enter the values into the conditional probabilistic model generating module to generate the conditional probabilistic model.

17. The system according to claim 13, wherein the controller is further configured to enter into the conditional probabilistic model generating module, values pertaining to an infrastructure of a plenum configured to supply airflow from the at least one air moving device to the at least one air delivery device, and wherein the conditional probabilistic model is further configured to consider the values in generating the conditional probabilistic model.

18. The system according to claim 13, wherein the controller is further configured to generate the conditional probabilistic model to include at least one of energy efficiency and thermal management metrics.

19. The system according to claim 13, wherein the controller is further configured to output predictions of the airflow rates supplied through a plurality of air delivery devices at a plurality of settings of a plurality of air moving devices.

20. A computer readable storage medium on which is embedded one or more computer programs, said one or more computer programs implementing a method for predicting a current airflow rate of at least one air delivery device, said one or more computer programs comprising a set of instructions for:

receiving a plurality of initial airflow rates through the at least one air delivery device at a plurality of initial airflow rates of at least one air moving device;

receiving amounts to which one or more additional air delivery devices are open;

generating a conditional probabilistic model with the initial air moving device flow rates and the amounts to which additional air delivery devices are open as inputs and the initial airflow rates through the at least one air delivery device as outputs, wherein the conditional probabilistic model correlates airflow rates from air delivery devices with air moving device airflow rates; and predicting the current airflow rate of the at least one air delivery device from the conditional probabilistic model.

* * * * *

UNITED STATES PATENT AND TRADEMARK OFFICE
CERTIFICATE OF CORRECTION

PATENT NO. : 7,558,649 B1
APPLICATION NO. : 11/416763
DATED : July 7, 2009
INVENTOR(S) : Ratnesh K. Sharma et al.

It is certified that error appears in the above-identified patent and that said Letters Patent is hereby corrected as shown below:

In column 4, line 67, before "214," delete "model" and insert -- module --, therefor.

In column 6, line 8, before "at least" delete "that" and insert -- the --, therefor.

In column 6, line 16, delete "generation" and insert -- generating --, therefor.

In column 8, line 30, delete "predicated" and insert -- predicted --, therefor.

In column 11, line 47, delete "predicated" and insert -- predicted --, therefor.

In column 14, line 1, in Claim 9, after "predicting" insert -- the --.

In column 14, line 26, in Claim 13, after "delivery" insert -- device --.

Signed and Sealed this

Fifth Day of January, 2010

David J. Kappos
*Director of the United States Patent and Trademark Office*